United States Patent
Koltay et al.

(10) Patent No.: US 9,459,128 B2
(45) Date of Patent: Oct. 4, 2016

(54) DEVICE AND METHOD FOR DISPENSING OR RECEIVING A LIQUID VOLUME

(71) Applicants: Hahn-Schickard-Gesellschaft fuer angewandte Forschung e.V., Villingen-Schwenningen (DE); Albert-Ludwigs-Universitaet Freiburg, Freiburg (DE)

(72) Inventors: Peter Koltay, Freiburg (DE); Andreas Ernst, Bollschweil (DE); Chris Steinert, Freiburg (DE); Laurent Tanguy, Freiburg (DE)

(73) Assignees: Hahn-Schickard-Gesellschaft fuer angewandte Forschung e.V., Villingen-Schwenningen (DE); Albert-Ludwigs-Universitaet Freiburg, Freiburg (DE)

( * ) Notice: Subject to any disclaimer, the term of this patent is extended or adjusted under 35 U.S.C. 154(b) by 267 days.

(21) Appl. No.: 13/907,365

(22) Filed: May 31, 2013

(65) Prior Publication Data

US 2013/0327787 A1    Dec. 12, 2013

(30) Foreign Application Priority Data

Jun. 1, 2012   (DE) .................. 10 2012 209 314

(51) Int. Cl.
G01F 15/02    (2006.01)
G01F 11/02    (2006.01)

(52) U.S. Cl.
CPC ............ *G01F 15/02* (2013.01); *G01F 11/021* (2013.01); *G01F 11/029* (2013.01)

(58) Field of Classification Search
CPC .... G01F 15/02; G01F 11/029; G01F 11/021; B67D 7/023
USPC ........ 222/386, 394, 61, 384, 55, 389, 386.5; 604/67
See application file for complete search history.

(56) References Cited

U.S. PATENT DOCUMENTS

| | | | |
|---|---|---|---|
| 4,675,301 A | 6/1987 | Charneski et al. | |
| 5,723,795 A | 3/1998 | Merriam | |
| 6,264,066 B1 * | 7/2001 | Vincent et al. | ................ 222/95 |
| 6,413,238 B1 * | 7/2002 | Maget | ............ 604/132 |
| 6,656,148 B2 | 12/2003 | Das et al. | |
| 6,830,558 B2 | 12/2004 | Flaherty et al. | |
| 7,900,850 B2 | 3/2011 | Zengerle et al. | |

(Continued)

FOREIGN PATENT DOCUMENTS

| | | | |
|---|---|---|---|
| CH | WO 2011121372 A1 * | 10/2011 | ............ A61J 7/0076 |
| DE | 100 52 819 A1 | 5/2002 | |

(Continued)

*Primary Examiner* — Kevin P Shaver
*Assistant Examiner* — Robert Nichols, II
(74) *Attorney, Agent, or Firm* — Keating & Bennett, LLP (57) ABSTRACT

A device for dispensing or receiving a liquid volume includes a liquid reservoir having an outlet, a pressure generator which provides a compressible enclosed gas volume of a constant amount of substance with a pressure, wherein the gas volume is in direct or indirect fluidic contact with the liquid in the liquid reservoir, a dosing device coupled to the outlet of the liquid reservoir and operable in order to enable the liquid to pass the outlet, a pressure sensor arranged to measure a current pressure in the gas volume and to output an output signal indicating the current pressure in the gas volume and a controller coupled to the pressure generator, the dosing device and the pressure sensor.

15 Claims, 2 Drawing Sheets

(56) References Cited

U.S. PATENT DOCUMENTS

| | | |
|---|---|---|
| 8,071,049 B2 | 12/2011 | Koltay et al. |
| 2004/0050861 A1 | 3/2004 | Lisec et al. |
| 2007/0048188 A1 | 3/2007 | Bigus |
| 2007/0090132 A1* | 4/2007 | Williams et al. .............. 222/389 |
| 2009/0055131 A1 | 2/2009 | Bukshpan et al. |
| 2010/0179488 A1 | 7/2010 | Spiegel et al. |
| 2014/0114238 A1* | 4/2014 | Lee et al. ........................ 604/67 |

FOREIGN PATENT DOCUMENTS

| | | |
|---|---|---|
| DE | 101 48 608 A1 | 9/2002 |
| DE | 103 44 700 A1 | 4/2005 |
| DE | 103 37 484 B4 | 5/2005 |
| DE | 600 35 608 T2 | 4/2008 |
| DE | 60 2005 002 918 T2 | 10/2008 |
| DE | 10 2008 053 411 A1 | 5/2010 |
| EP | 1 347 152 A2 | 9/2003 |
| EP | 1 669 762 B1 | 10/2007 |
| EP | 2 210 667 A1 | 7/2010 |
| JP | 2004-251818 A | 9/2004 |
| WO | 96/11024 A1 | 4/1996 |
| WO | 01/37903 A2 | 5/2001 |
| WO | 2005/016534 A1 | 2/2005 |
| WO | 2005/121780 A2 | 12/2005 |
| WO | 2006/076957 A1 | 7/2006 |
| WO | 2007/074363 A2 | 7/2007 |

* cited by examiner

DEVICE AND METHOD FOR DISPENSING OR RECEIVING A LIQUID VOLUME

CROSS-REFERENCE TO RELATED APPLICATIONS

This application claims priority from German Patent Application No. 102012209314.1, which was filed on Jun. 1, 2012, and is incorporated herein in its entirety by reference.

BACKGROUND OF THE INVENTION

The present invention relates to devices and methods for dispensing or receiving a liquid volume, and in particular to devices and methods which enable a precise dosing of a liquid volume.

From standard technology, different dosing systems are known, wherein a difference may be made between dosing systems for continuous delivery and open-jet dosing systems.

Those dosing systems may be referred to as dosing systems for a continuous delivery which can deliver liquids in a closed system, if applicable also against a counter-pressure acting at the output or dispensing position. Such systems may also deliver discrete volumes by a time control. Examples of such systems are perfusor pumps, insulin pumps, fuel pumps, etc.

DE 10 2008 053 411 A1 describes a pressure-driven dosing system, wherein a flow sensor is used in order to monitor the amount of fuel gas in a storage reservoir which flows out after dosing and thus possibly to regulate dosing by switching a dosing valve. In addition, a pressure sensor may be provided to support the determination of an air volume streaming from a pressure source to the storage reservoir.

From WO 96/11024 A1, a continuous dosing system is known which is based on the drive of a liquid by a disposable syringe pump. As a measured value according to WO 96/11024 A1, the position of a syringe piston of the syringe pump is used which is determined by a sensor at the proximal end of the same. Alternatively, it is known from U.S. Pat. No. 6,656,148 B2 to consider the force necessitated for moving the piston of a syringe pump as a sensor variable. As the force determined at the piston also contains portions of frictional forces of the piston drive which may be unknown and variable, the method described herein may be inaccurate.

From U.S. Pat. No. 6,830,558 B2, an infusion device is known wherein a pressure sensor is provided to be able to detect flow conditions, for example the closing of a flow path or an inadequate flow within the flow path.

In contrast to dosing systems for a continuous delivery, open-jet dosing systems enable the dosing of liquids as freely flowing liquid drops or liquid jets through the air. Such systems may in particular be utilized in a volume range of less than 1 µl. Typical examples here are systems based on the ink-jet principle, systems wherein dispensing or outputting a pressurized liquid is controlled by dosing valves, or systems wherein liquid is dispensed by squeezing a tube. Different methods are known here to determine the dosed volumes or to monitor and regulate dosing.

Here, frequently small sensor units are used which do not influence the dosing process and allow a monitoring of the process or regulation of the dosed amount in real time (online method).

Thus, EP 1347152 B1 discloses a method based on continuous measurements of the flow rate in a supply channel of a nozzle. From the measured flow rate, by temporal integration, the dispensed liquid amount may be calculated. A substantial disadvantage of such systems is, however, that the mass flow sensors have to be individually calibrated to each liquid used and cannot be used as disposable products due to the expensive sensors.

Other methods, wherein sensors integrated into the supply line to a nozzle allow information to be given about dosed volumes on the basis of impedance measurements, pH value measurements or conductivity measurements, are, for example, known from WO 2005/121780 A2. Such sensors serve for monitoring the dosing process and documenting its quality.

Further, methods are known from standard technology, wherein dosed liquid amounts are not determined by internal sensors before leaving the nozzle but only after being dispensed from the dosing unit. The information thereby gained may be utilized to have a controlling or regulating effect on the process and thus increase its precision. In this respect, reference is made, for example, to US 2009/0055131 A1. Regulations relating to this known method refer to sensors which may determine the volume of the dosed liquid in order to actively adapt the dosing to the desired target volume based on the sensor data. For example, according to JP 2004-251818 A, such a method is based on a volume measurement of individual applied drops which is used to readjust the number and the drop volume of the subsequent dosing operations and thus be able to adapt the overall volume dispensed in many individual drops more precisely to the set value.

Further, pipetting systems are known which keep the pressure boundary conditions in a dosing system constant using integrated pressure sensors by means of active regulation or controlling. In this way, dispensing a liquid amount under constant known conditions may be guaranteed, see, for example, U.S. Pat. No. 5,723,795 and U.S. Pat. No. 4,675,301. It is further known from DE 602005002918 T2 to use integrated pressure sensors to execute a liquid level detection. This method serves for determining the liquid level in a sample cavity which only has an indirect influence on the dosing volume, however.

SUMMARY

According to an embodiment, a device for dispensing or receiving a liquid volume may have a liquid container having an outlet; a pressure generator which is implemented to provide a compressible gas volume with a constant amount of substance enclosed in the liquid reservoir with a pressure, wherein the gas volume is in direct or indirect fluidic contact with the liquid in the liquid reservoir; a doser coupled to the outlet of the liquid reservoir and configured to be operated in order to enable the liquid to pass the outlet; a pressure sensor for measuring a pressure existing in the gas volume and for outputting an output signal indicating the current pressure in the gas volume; and a controller coupled to the pressure generator, the doser and the pressure sensor and which is implemented to: control the pressure generator in order to change the pressure in the gas volume until the output signal of the pressure sensor indicates a first pressure, while the doser is not operated so that it prevents liquid from passing the outlet, operate the doser depending on the output signal of the pressure sensor in order to dispense or receive liquid through the outlet, and while dispensing or receiving liquid through the outlet, monitor the output signal of the pressure sensor and, depending on the monitored output signal of the pressure sensor, at least temporarily terminate the operation of the doser.

According to another embodiment, a method for dispensing or receiving a liquid volume may have the steps of providing a liquid in a liquid reservoir having an outlet; providing a compressible enclosed gas volume with a constant amount of substance which is in direct or indirect fluidic contact with the liquid in the liquid reservoir; changing the pressure in the gas volume until a pressure sensor indicates that a first pressure exists in the gas volume; operating a doser coupled to the outlet of the liquid reservoir in order to thus dispense liquid through the outlet from the liquid reservoir or receive the same in the liquid reservoir; while dispensing or receiving liquid through the outlet, monitoring the output signal of the pressure sensor; and depending on the monitored output signal of the pressure sensor, at least temporarily terminating the operation of the doser.

Embodiments of the invention provide a device for dispensing or receiving a liquid volume, comprising:
a liquid container having an outlet;
a pressure generation means which is implemented to provide a compressible gas volume with a constant amount of substance enclosed in the liquid reservoir with a pressure, wherein the gas volume is in direct or indirect fluidic contact with the liquid in the liquid reservoir;
a dosing means coupled to the outlet of the liquid reservoir and operable in order to enable the liquid to pass the outlet;
a pressure sensor for measuring a pressure existing in the gas volume and for outputting an output signal indicating the pressure present in the gas volume; and
a controller coupled to the pressure generation means, the dosing means and the pressure sensor and which is implemented to:
control the pressure generation means in order to change the pressure in the gas volume until the output signal of the pressure sensor indicates a first pressure, while the dosing means is not operated so that it prevents liquid from passing the outlet,
operate the dosing means depending on the output signal of the pressure sensor in order to dispense or receive liquid through the outlet, and
during dispensing or receiving liquid through the outlet monitor the output signal of the pressure sensor and, depending on the monitored output signal of the pressure sensor, at least temporarily terminate the operation of the dosing means.

Embodiments of the invention provide a method for dispensing or receiving a liquid volume, comprising:
providing a liquid in a liquid reservoir comprising an outlet;
providing a compressible enclosed gas volume with a constant amount of substance which is in direct or indirect fluidic contact with the liquid in the liquid reservoir;
changing the pressure in the gas volume until a pressure sensor indicates that a first pressure exists in the gas volume;
operating a dosing means coupled to the outlet of the liquid reservoir in order to thus discharge liquid through the outlet from the liquid reservoir or receive the same in the liquid reservoir;
during outputting or receiving liquid through the outlet, monitoring the output signal of the pressure sensor; and depending on the monitored output signal of the pressure sensor, at least temporarily terminating the operation of the dosing means.

Embodiments of the invention thus provide a new concept for dispensing or receiving a defined liquid volume, wherein first of all a compressible enclosed gas volume which is in direct or indirect fluidic contact with liquid in a liquid reservoir is provided with a pressure until the output signal of the pressure sensor indicates a first pressure. Here, the dosing means is not operated, so that liquid is prevented from passing the outlet. The pressure generation means is controlled when reaching a first pressure in order to not further change the pressure in the gas volume, for example not to increase the same, so that, for example, a cavity volume in which the liquid and the gas volume are enclosed remains unchanged when the dosing means is not operated. Based on this state, the dosing means is operated in order to dispense liquid from the outlet or receive it through the outlet. For example, the dosing means may be operated when the output signal of the pressure sensor indicates the first pressure. Dosing may, however, also start later by operating the dosing means. The output signal of the pressure sensor is monitored and, depending on the monitored output signal of the pressure sensor, the operation of the dosing means is at least temporarily terminated. It is thus possible, by monitoring the output signal of the pressure sensor, to terminate or end the operation of the dosing means as soon as a defined (desired) liquid volume has been dispensed, as the pressure change in the gas volume is connected to the dispensed liquid volume.

In embodiments of the invention, the gas volume comprises a constant amount of substance. The amount of substance may here be the number of molecules in the gas volumes. If the correctness of the dispensed or received volume is of importance, i.e. if the actual value of the volume is to correspond to the default set value as closely as possible, it is advantageous if the amount of substance of the gas volume is known. If only the precision of dosing is of importance, i.e. a volume which is not exactly given is to be dispensed or received repeatedly as equally as possible, it is not necessary for the amount of substance of the enclosed volume to be known.

Different algorithms may be used to terminate the operation of the dosing means on the basis of the monitored output signal. For example, the operation of the dosing means may be terminated when the monitored output signal of the pressure sensor indicates that the pressure in the gas volume has changed by a predetermined pressure difference, for example has decreased by a certain pressure difference. Alternatively, on the basis of the output signals of the pressure sensor over time, a flow rate of dispensing or receiving the liquid through the outlet and/or an all in all dispensed or received volume of liquid may be calculated so that the operation of the dosing means may be terminated when the flow rate and/or the overall dispensed or received liquid volume indicates dispensing or receiving a certain liquid volume.

In embodiments of the invention, volumes associated with corresponding output signals of the pressure sensor may be determined during a calibration of the device, so that in the later operation, depending on the monitored output signal of the pressure sensor, the operation of the dosing means may be terminated when a defined (desired) liquid volume has been dispensed or received.

In embodiments of the invention, the controller may further be implemented to detect the presence of an interference based on the output signals of the pressure sensor.

In embodiments of the invention, the controller may be implemented in any suitable way, for example as a microprocessor, as a computer-based program-controlled computing device or as an FPGA.

In embodiments of the invention, the pressure generation means may comprise a syringe pump having a syringe body and a piston, wherein the piston is movable for changing, for example increasing, the pressure in the gas volume relative to the syringe body by means of a drive. In embodiments of the invention, the liquid reservoir may be formed by the syringe body, so that the liquid to be dispensed and the compressible gas volume are enclosed in the syringe body. In embodiments of the invention, the piston of the syringe pump may comprise a bore, wherein at least parts of the compressible gas volume are arranged within the bore. In embodiments, the pressure sensor may be in a fluidic contact with the enclosed gas volume via the bore, which enables a simple setup and a simple separation of the pressure sensor from the liquid to be dispensed. In embodiments of the invention, the liquid reservoir may be implemented as a component which may be detached from the pressure generation means, for example a pipette tip mountable to the pressure generation means. In embodiments, a part of the enclosed gas volume may be enclosed in the liquid reservoir.

In embodiments, the gas volume is in direct fluidic contact with the liquid in the liquid reservoir, for example the liquid to be dispensed. In embodiments, the gas volume is in indirect fluidic contact with this liquid, for example by a flexible membrane or a further liquid being provided between the same. A direct or indirect fluidic contact here is a contact wherein two fluids are in direct contact or are separated from each other by a flexible means or a medium such that they are under the same pressure, i.e. that a pressure change in one fluid is transferred to the other fluid.

In addition to the pump means, in embodiments of the invention a dosing means is provided coupled to the outlet of the liquid reservoir. The dosing means is coupled to the outlet of the liquid reservoir such that it enables, in a operative state, the passing of liquid through the outlet, i.e. for example dispensing liquid from the outlet, while in the non-operative state it prevents the passing of liquid through the outlet, at least at the used pressures prevailing in the liquid reservoir. In embodiments of the invention, the outlet may represent an outlet opening or an outlet line in a flow cross-section reduced with respect to the liquid reservoir. In embodiments of the invention, the dosing means may be implemented as a micropump, a peristaltic pump, a dosing valve or a pinch valve. In embodiments of the invention, the dosing means may comprise a flexible tube and a displacer by which the volume of a section of the flexible tube may be changed in order to dispense the liquid to be dispensed as freely-flowing droplets or as a freely-flowing jet.

Embodiments of the present invention thus provide a new approach for dispensing or receiving liquid volumes and in particular for outputting defined liquid volumes wherein the precision and correctness of the dosing volume may be guaranteed using measurement values of a pressure sensor.

In embodiments of the invention, the pressure sensor is implemented to generate an output signal which is able to continuously indicate the pressure existing in the gas volume.

BRIEF DESCRIPTION OF THE DRAWINGS

Embodiments of the present invention will be detailed subsequently referring to the appended drawings, in which.

DETAILED DESCRIPTION OF THE INVENTION

Before embodiments are discussed in more detail, it is first of all stated in what fields the present invention may be applied. There is extensive need for the precise dosing of liquids in particular in a volume range of less than 1 µl using cost-effective disposable components with a simultaneous monitoring of the correctness and precision of dosing, wherein a 100% process control is desired. The present invention is suitable for fulfilling this need. The above-mentioned object relates both to industrial and also medical dosing systems, both for the continuous delivery of liquid and open-jet dosing systems for dosing drops in a sub-microliter range for pharmaceutical and molecular biological research as well as for in-vitro diagnostics. Examples of a continuous delivery of liquids are, for example, perfusors, infusion systems, insulin pumps, etc. Examples of open-jet systems are pipetting systems for the nanoliter range, pressure systems for biosensors and dispensing system for pharmaceutical research and pharmaceutical production.

In such applications, embodiments of the invention allow the dosing of small volumes, typically <1 µm, with high correctness and precision, the use of disposable components for all fluid-carrying parts, for example disposable syringes, disposable pipette syringes and disposable tubes made of plastics, as well as a 100% monitoring of the dosing process with respect to the correctness of the volume and the detection of malfunctions, such as, for example, clogging, erroneous dosing or an empty reservoir, i.e. liquid container. Embodiments thus further enable the detection of sealing problems on the basis of the continuously monitored pressure in the gas volume.

In the following, in particular embodiments are described which are designed for dispensing a liquid volume. It is obvious for persons skilled in the art, however, that in an analog way by correspondingly setting the respective pressures, embodiments may be implemented which are designed for receiving a liquid volume. In such embodiments, an external liquid is received which is located in the liquid container after dosing in addition to liquid which was already previously contained in the liquid reservoir. Receiving or taking in liquid in the liquid reservoir may, for example, be acquired by correspondingly setting a negative pressure in the liquid reservoir by means of the pressure generation means. Considerations made in the following with respect to dispensing liquid apply analogously to receiving a liquid.

In the following, in particular embodiments are described in which an overpressure is generated by the pressure generation means in the liquid reservoir. In alternative embodiments it is possible that by the pressure generation means a negative pressure $P_1$ with respect to a previously existing pressure $P_0$ and/or with respect to a pressure at the outlet is generated. In such a case, two possibilities exist depending on whether a passive dosing unit or an active dosing unit is used. An active dosing unit here is one which is able to deliver, acting against the underpressure in the liquid reservoir, while a passive dosing unit is a unit which is not able to do this. In case of a passive dosing unit and a negative pressure or underpressure in the liquid reservoir, liquid regulated by the dispensing unit would be sucked into the liquid reservoir, for example a syringe pump. This may be regarded as a dosing with a negative volume and enables, in embodiments of the invention, a precisely regulated withdrawal of liquid. In case of an active dosing unit, the dosing unit may also operate against a negative pressure in the supply reservoir, which leads to a negative pressure difference (ΔP<0). The sign of the pressure difference is unimportant for the volume calculation, for example according to the ideal gas law, so that the regulation works just as well also for negative pressure differences in the supply reservoir.

Embodiments of the invention are based on a disposable syringe, as is used, for example, in injection systems and perfusors. This disposable syringe can store the complete amount of liquid supply to be dosed and can be modified such that in the syringe a cavity filled with a compressible gas is arranged, fluidically connected on the one hand to the liquid and on the other hand to a pressure sensor which measures the gas pressure in the cavity. In embodiments of the invention, the pressure sensor does not come into contact with the dosing medium, is not contaminated and does not have to be disposed of with parts which come into contact with the liquid, for example the syringe. At the outlet of the syringe a dosing unit is located, for example an open-jet dosing unit which operates according to the method described in WO 2005/016534 A1. The components of the dosing unit which come into contact with the liquid may be implemented as one-way components. The dosing unit converts the pressure exerted in the disposable syringe into a volume flow which enables delivering a liquid volume from the syringe. The precision and correctness of the dosing volume is here guaranteed by an active control (regulation) based on the measurement values of the pressure sensor.

The dosing unit may be implemented as any unit which, with the used pressures in a non-operated state, prevents the escape of liquid from the outlet and, when operating the same, enables an output of liquid from the outlet. For example, the dosing unit may be formed by any dosing valve which opens and closes an outlet opening or by a pinch valve which may close an outlet channel by pinching. In alternative embodiments, the dosing unit may be formed by a micropump or peristaltic pump which forms a high flow resistance in a non-operated state so that an escape of liquid from the outlet is prevented with the used pressures.

One embodiment of the invention in which the pump unit comprises a syringe pump is explained in the following with reference to FIG. 1.

The syringe pump comprises a syringe body 10 and a piston 12 movable within the syringe body 10. The piston 12 is movable, by means of a drive designated schematically by reference numeral 14 in FIG. 1, along the longitudinal axis of the syringe body. By moving the piston, the pressure in the interior of the syringe pump is controllable, i.e. the pressure may, for example, be increased when the piston in FIG. 1 is moved to the left. FIG. 1 illustrates a schematical sectional view wherein it may be gathered that the syringe body 10 comprises an area 10a with a large interior cross-section in which the piston 12 moves and an area 10b with a small interior cross-section. The area 10b represents an outlet channel of the syringe body 10 with an outlet 14, wherein an dosing unit 16 is coupled to the outlet 14.

The piston 12 comprises a bore 18 which longitudinally passes through the same. At the rear end of the piston a pressure sensor 20 is fluidically coupled to the bore. At the front end of the piston, the bore 18 may be provided with an optional membrane 22 in order to be able to reliably rule out any contamination of the pressure sensor by a liquid 24 contained in the syringe body 10. In the bore 18 a compressible gas volume 26 (VGas) with a constant amount of substance which may be known may be enclosed.

In alternative embodiments, the interior space of section 10a of the syringe body 10 not completely occupied by the piston 12 is not completely filled with the liquid, but a part of the enclosed gas volume may be located on the side facing away from the outlet 14 in this area 10a. In embodiments of the invention, the syringe pump is implemented as a disposable syringe with the exception of the pressure sensor 20. As indicated, the syringe pump comprises the syringe body 10 and the piston 12 which enclose a compressible gas volume with a constant amount of substance. The pressure sensor 20 is in fluidic contact with the enclosed gas volume via the bore 18 which passes through the piston longitudinally, for example centrally, in the illustrated embodiment.

The drive 14 may be implemented by any known drive unit for a syringe pump which enables it to effect a relative movement between the piston and the syringe body so that a description of such a drive is not required herein. The device for dispensing a liquid volume further comprises a controller 30 which is coupled to the drive 14, the dosing unit 16 and the pressure sensor 20 in order to exchange electrical signals with these entities. In more detail, the controller 30 receives signals from the pressure sensor 20 which indicate the pressure prevailing in the gas volume 26. The pressure sensor 20 is implemented to measure the pressure prevailing in the gas volume 26. The controller 30 is coupled to the drive 14 and the dosing unit 16 to accordingly control the same at least partially based on the output signals of the pressure sensor 20. The drive is implemented to be operated depending on the output signal of the pressure sensor 20 by the controller and the dosing unit 16 is connected to the outlet 14 of the syringe pump to deliver a liquid from the syringe pump also depending on the output signal of the pressure sensor.

Figure 1:
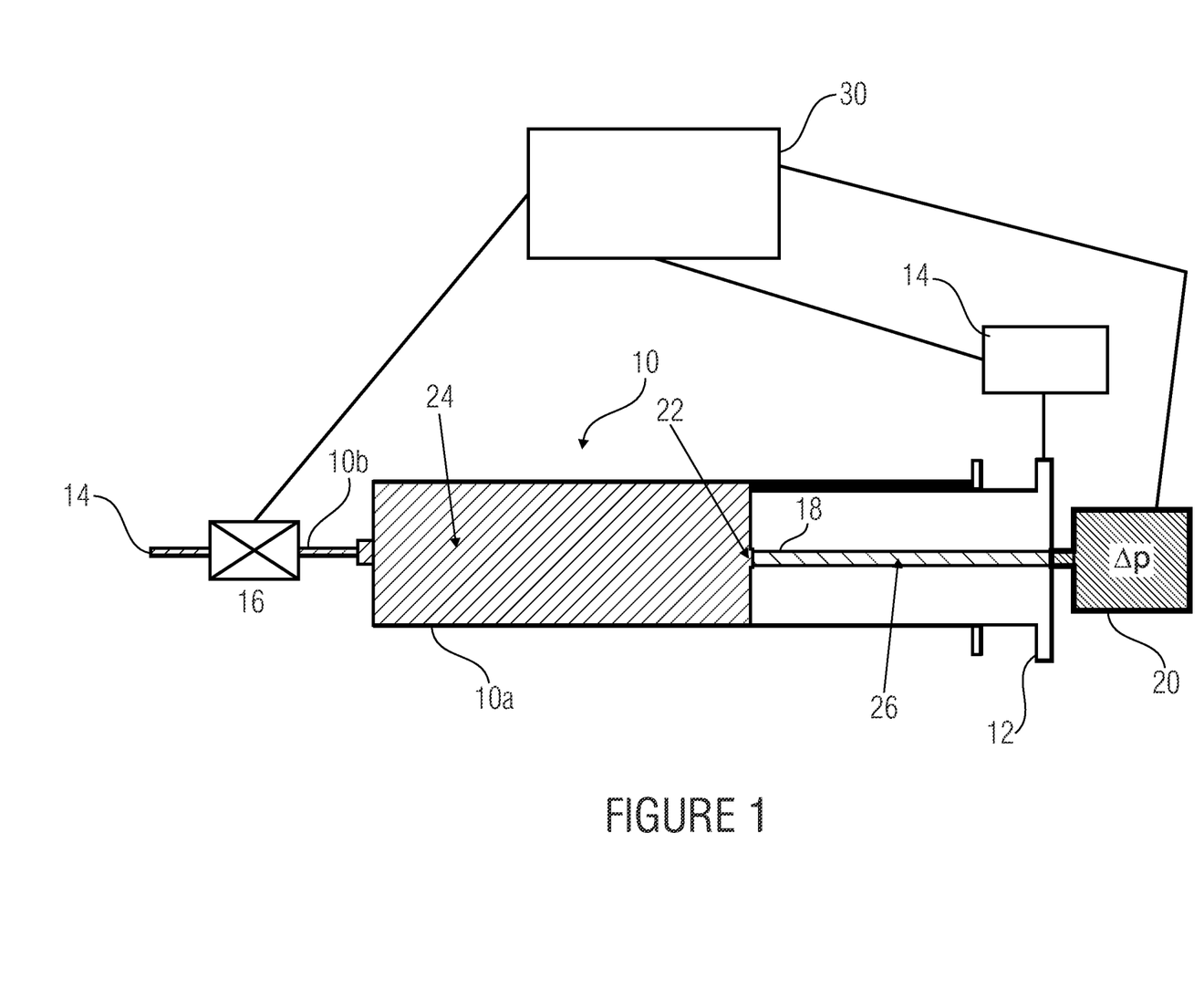
FIG. 1 is a schematical illustration of an embodiment of an inventive device.

The embodiment of an inventive dosing system illustrated in FIG. 1 thus consists of a liquid-filled disposable syringe, a gas volume enclosed within the syringe in fluidic connection with an external, reusable pressure sensor and a dosing unit for regulating and/or delivering liquid at the outlet end of the syringe and a corresponding drive for the piston and a controller.

With reference to the operation of the embodiment illustrated in FIG. 1, now an embodiment of an inventive method for a regulated dosing will be described. It is to be noted here that the description of the operation not only applies to the embodiment illustrated in FIG. 1, but analogously also applies to other embodiments.

First of all, liquid to be dosed is received in or taken into the syringe pump, for example by aspiration via the outlet 14. After filling, there is an initial pressure $P_0$ in the syringe pump and consequently in the gas volume 26. Based on this state, by operating the piston, an overpressure (with respect to the initial pressure $P_0$) is generated by operating the piston using the drive 14 until the output signal of the pressure sensor 20 indicates a pressure value of at least $P_1$. By this, the enclosed gas volume 26 is compressed. The value $P_1$, depending on the gas law used for the regulation (e.g. Boyle-Mariotte's law) is to correspond at least to the volume to be dosed. Without limitation of generality, with respect to the gas law applied, the formula for determining $P_1$, for example using Boyle-Mariotte's law, may be formulated mathematically as follows:

$$P_1 \geq \frac{NkT}{V_{Gas} - V} + P_0$$

Here, N is the number of particles in the enclosed gas volume, k is the Boltzmann constant, T is the absolute temperature, $V_{Gas}$ is the enclosed gas volume before generating the overpressure and V the desired dosing volume. When generating the overpressure $P_1$ it is to be noted that the desired dosing volume V has to be smaller than the enclosed gas volume $V_{Gas}$. While setting the pressure $P_1$ by operating the piston, the dosing unit 16 ought to prevent the liquid from flowing out at the outlet 14, i.e. the dispensing position, for example by means of a closed dosing valve in order to be able to acquire the highest possible precision.

As soon as the controller 30 detects that the pressure sensor indicates the pressure $P_1$, it does not continue to operate the pump means, i.e. it leaves the piston in this position so that the interior volume enclosed by the syringe pump no longer changes. Starting from this state, the controller 30 now operates the dosing unit located at the outlet end of the syringe pump in order to supply a liquid from the outlet until, based on the increased pressure $P_1$, a decrease of the pressure by a value $\Delta P$ has resulted. This decrease is detected by the pressure sensor whose output signal indicates a second correspondingly reduced pressure $P_2$: $\Delta P = P_1 - P_2$. For a considered special case of an ideal gas, $\Delta P$ may be calculated as follows:

$$\Delta P = \frac{NkT}{V_{Gas} - V}$$

Obviously, with a constant temperature and constant enclosed gas volume, the pressure difference $\Delta P$ is clearly linked with the dosing volume V via the gas law.

While supplying the liquid in a period of time $t \in [t_a; t_e]$, the measured pressure $P(t) - P_0$ when neglecting dynamic effects, at any time approximately corresponds to the dosing volume $V(t)$ already supplied or delivered up to the time t, whereby a continuous monitoring of the flow rate at the dispensing position is possible. Thus, depending on the desired liquid volume to be dispensed and the output signal of the pressure sensor, the operation of the dosing means may be terminated depending on the output signal of the pressure sensor in order to output the desired liquid volume.

For the already considered special case of an ideal gas with a constant temperature and when neglecting dynamic effects, the flow rate $dV/dt$ at the dispensing position may be calculated while dosing based on the temporal change of the pressure signal $dP/dt$ as follows:

$$\frac{dV}{dt} = -\frac{V}{P}\frac{dP}{dt}$$

Thus, embodiments of the invention enable plotting the time-varying pressure while dispensing the liquid in order, for example, to calculate the flow rate or the overall dispensed volume therefrom. The calculation may here, based on approximately valid formulae (as described above exemplarily), be done using more exact physical models (which, e.g., also take mechanical deformations of the pump means and dynamic effects into consideration) or using empirical models. This enables determining further interferences of the dosing process, such as, for example, a clogged dispensing position or the like.

In embodiments of the invention, the enclosed gas volume will be an air volume, wherein the liquid to be dispensed depends on the respective application purpose and may, for example, be a solution based on water.

Embodiments of the present invention thus enable the determination of the interior pressure of a syringe pump using a gas pressure sensor which is in fluidic connection with a closed compressible gas volume $V_{Gas}$ with a constant amount of substance in the interior of the syringe. The pressure sensor may here be implemented as a membrane sensor, for example as a silicon membrane sensor. In embodiments of the invention, the membrane of the pressure sensor is not implemented as a disposable component, so that the pressure sensor enables precise measurements. Embodiments of the invention enable the determination of the already dosed liquid volume using the fact that the dosed liquid volume (provided that the syringe pump is sufficiently incompressible) has to correspond to the volume change of the enclosed gas volume, which may be calculated using a gas law, for example Boyle-Mariotte's law, from the measured pressure and the temperature. In embodiments of the invention, thus the dosed volume is not regulated itself by the pump means (for example the syringe) but by a dosing unit which is applied to the outlet of the liquid reservoir and supplies the liquid until the pressure value $P_1 - \Delta P$ has been set within the enclosed volume. $\Delta P$ here corresponds, according to the gas law used, to the volume V to be dosed. Embodiments of the invention enable monitoring the flow rate $dV/dt$ at the dispensing position while dosing on the basis of the temporal change in the pressure signal $dP/dt$ and, derived therefrom, different possibilities for detection of interferences of the dosing process. One or several flow sensors and the problems connected therewith regarding calibration for different liquids to be dosed are not required and are thus not provided in embodiments of the invention. In embodiments of the invention, devices (sensors) for the detection of further environmental parameters, such as, for example, environmental pressure, temperature, position of the syringe pump and the like, may be provided. Data on the basis of the detected environmental parameters may be integrated into the control algorithm in order to improve the accuracy of dosing. This task has, for example, already been illustrated using the example of the temperature-dependent volume calculation according to the ideal gas law.

A further possibility for improving the accuracy of the dosed overall volume V is, for example, to divide the same into at least two partial volumes V1 and V2 which are dosed one after the other. According to the invention, dosing of V1 is here executed in a controlled manner on the basis of an algorithm. For dosing the second partial volume V2, in addition data which relate to the first dosing, such as, e.g., the duration of the first dosing and the pressure at the end of the first dosing which, according to a gas law, corresponds to the volume of the first dosing, may be used as further information for a precise control. By these methods, the influence of dynamic effects and possibly drift of environmental conditions and the sensor signals may be minimized. On the other hand, by the iterative operation precision may further be increased and in particular over-dosages may reliably be prevented. In embodiments of the invention, thus the complete volume V may be divided into individual volumes which may be output successively/iteratively. Such an operation enables an online calibration while dosing a liquid volume. Here, data gained from previous dosing operations (pressure, dosing duration, etc.) may be used for controlling the current dosing. The control algorithm is thus not only limited to the currently recorded signal, but (all) signal recordings from the past may be included.

The embodiment illustrated in FIG. 1 may, for example, be suitable for continuous dosing. The enclosed gas volume is here simply realized by a bore 18 in the piston 12 which may be realized, for example, in a medical injection syringe made of plastic. In order to prevent the escape of liquid and a contamination, the bore may be closed by an optional elastic membrane 22 which separates gas 26 and liquid 24 from each other. The pressure sensor may simply be attached to the other end of the bore, for example by being mounted to the drive which operates the piston, and, for example, sealed with the help of an O-ring, fluidically contacts the gas volume enclosed in the bore 18 in the piston 12. It is to be noted here that the illustration of the drive unit 14 in FIG. 1 is purely schematical. With the help of such an arrangement, the pressure sensor may also be used to detect whether the drive is in contact with the syringe pump at all or whether a syringe pump is inserted. If no fluidic contact results between the pressure sensor and the piston, the pressure signal will not rise when operating the drive.

As a dosing unit 16 at the outlet end of the syringe a disposable micropump may, for example, be used, as it is disclosed in WO 2007/074363 A2. This pump would, for example, be able to supply liquids also against a pressure $P_A$ at the outlet (of the dispensing position) which may be higher than the ambient pressure $P_0$. Further, this pump would provide the advantage that the dosing system is completely sealed in the idle state.

Alternatively, however, also other dosing units, for example a passive dosing unit in the form of a pinch valve might be used. In this case, the valve would release the overpressure in the interior of the syringe in a controlled manner until at maximum the initial pressure $P_0$ is reestablished, i.e. no active drive by the dosing unit takes place. In such embodiments of the invention the operation of the dosing unit may be to terminate the active operation of the same, by, for example, squeezing the tube until a complete balancing of the pressure difference in the liquid reservoir has taken place. As the control of the dosing volume does not urgently require reducing back to ambient pressure $P_0$, supplying against a pressure $P_A$ at the dispensing position may also be executed using this arrangement. For this purpose, before dosing, the interior pressure of the syringe has to be increased to $P_1 = \Delta P + P_A$ so that, also after releasing the pressure by $\Delta P$ in the syringe, at least a pressure $P_A$ prevails.

Independent of the specific implementation, embodiments of the invention are thus also suitable for increased and, in particular, variable pressures at the dispensing position, as a control is only executed to the pressure difference $\Delta P$ which corresponds to the volume to be dosed. If the counter-pressure initially prevailing in the syringe is sufficiently high, i.e. higher than the counter-pressure to be expected at maximum at the dispensing position in addition to the pressure which corresponds to the dosing volume, a precise dosing may be executed both with active and also with passive dosing units.

One embodiment of an inventive device for dispensing a liquid volume which is suitable for an open-jet dosing is explained in the following with reference to FIG. 2.

In open-jet dosing, in contrast to continuous dosing, the liquid has to be supplied sufficiently fast in order to generate a freely flowing drop or an open jet. Low flow rates may lead to an uncontrolled drain or dripping at the outlet (the dispensing position). For this reason in particular, a syringe pump without a corresponding highly dynamic drive is generally not suitable for open-jet dosing. As far as the dosing unit provided according to the invention comprises sufficiently high dynamics, also open jets may be generated. Thus, embodiments of the invention including the above-described embodiment are basically suitable for open-jet dosing if the dosing unit, for example the micropump or the pinch valve, enables sufficiently high flow rates to generate Weber numbers of at least 8, for example of 12.

Figure 2:
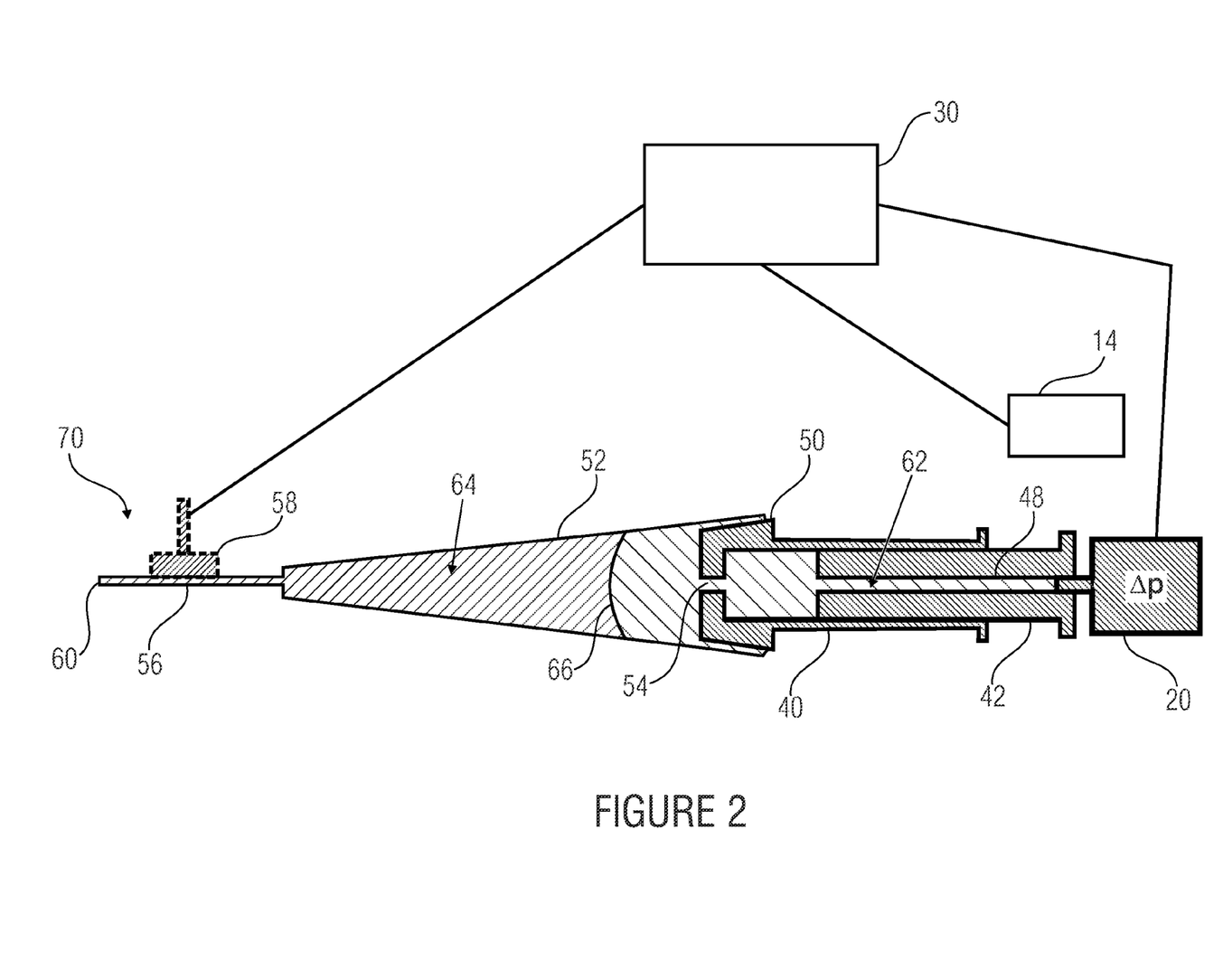
FIG. 2 is a schematical illustration of a further embodiment of an inventive device.

In the embodiment illustrated in FIG. 2, the pump means comprises a syringe body 40 and a piston 42 movable by means of a drive unit 14 in the pump body 40. The piston 42, as is conventionally the case with syringes, is movable again along the longitudinal axis of the pump body 40, so that the enclosed syringe volume may be varied, whereby again the pressure in the interior of the syringe may be set. The syringe body 40 comprises a cone 50, via which a pipette tip 52 is mechanically and fluidically connected to the syringe body 40. In more detail, an interior side of the pipette tip 52 is mechanically connected to the cone 50, while the interior of the pipette tip 52 is fluidically coupled to the interior of the syringe body 40 via an opening 54. The pipette tip may, for example, be a pipette tip as is described in WO 2006/076957 A1, which is included herein by reference. At the front end, the pipette tip 52 may comprise a flexible tube 56 whose interior volume is variable by a displacer 58 in order to output a liquid from the flexible tube 56 at the outlet end 60. With regard to the implementation of a corresponding dosing unit, reference is made to WO 2005/016534 A1 and DE 10 337 484 whose teaching is incorporated herein by reference in its entirety.

As is illustrated in FIG. 2, the piston 42 again comprises a bore 48 passing through the same in the longitudinal direction, wherein the pressure sensor 20 is connected at the rear end of the bore. In the embodiment illustrated in FIG. 2, a compressible gas volume 62 with a constant amount of substance is formed in the interior of the bore 48, in the interior of the syringe body 40 and in parts of the interior of the pipette tip 52. A boundary surface between a liquid 64 to be dosed and the gas volume 62 is designated by reference numeral 66 in FIG. 2. Again a controller 30 is provided which is implemented to receive the output signals of the pressure sensor 20 and in response to the same control or operate the drive unit 14 and the dosing unit 70 formed by the displacer 58 and the flexible tube 56. The operation of the device illustrated in FIG. 2 may correspond to the operation of the embodiment described above with reference to FIG. 1. First of all, the liquid to be dispensed is introduced into the pipette tip 52, for example by aspiration through the outlet 60. Then, by operating the syringe pump, the pressure in the interior of the syringe is increased until the pressure sensor 20 indicates the pressure $P_1$. When this pressure is reached, the dosing unit is operated until the pressure in the syringe has decreased by the pressure difference $\Delta P$, which corresponds to dispensing the desired liquid volume. Thereupon, the operation of the dosing unit 70 is terminated.

With open-jet dosing units, apart from the generation of the open jet with the requested correctness and precision and the monitoring of the dosing process, as is enabled by the pressure sensor 20, also the automatic changeability of the contaminated disposable components is of considerable importance. This makes the embodiment illustrated in FIG. 2 possible in a specially advantageous way which provides the special pipette tip 52 as a disposable component. In this embodiment, the complete syringe pump is not designed as a disposable component, but as a permanent pneumatic drive component which does not get into contact with the liquid to be dosed. Rather, the liquid to be dosed is completely located within the disposable pipette tip connected fluidically and mechanically via a cone to the syringe pump which comprises the syringe body 40 and the piston 42 and which may, for example, be filled with liquid by aspiration through the outlet opening 60. Regarding the pipette tip and syringe pump, the setup may correspond to that of a conventional piston-stroke pipette according to the prior art.

In the illustrated embodiment of the invention, in addition to the piston-stroke pipette which could not effect open-jet dosing by itself, at the end of the pipette tip 52 implemented in the shape of a tube a dosing unit 70 is realized, for example, according to the technology described in WO 2005/016534. In this respect, an operating means referred to as the displacer 58 is brought into contact with the tube 56, wherein the operating means is not implemented as a disposable component either. By operating the displacer 58 by means of the controller 30, a freely flowing drop may be generated at the outlet 50. The freely flowing drops may be generated until the pressure detected by the pressure sensor 20 has decreased by the pressure difference $\Delta P$, whereupon the operation of the dosing unit is terminated. With the help of the dosing method according to the embodiment of the invention, thus using a piston-stroke pipette, a corresponding special pipette tip and a corresponding dosing unit, controlled and monitored dosing from a disposable pipette tip is possible.

Regarding the embodiment illustrated in FIG. 2, it is to be noted that the flexible tube 56 in the idle state does not present a closure of the outlet opening. In this embodiment it is to be noted that the pressure $P_1$ generated in the syringe pump, and thus the pipette tip, is lower than the capillary pressure in the tube 56 so that, without operating the dosing unit 70, no liquid escapes from the outlet 60.

The operation of the embodiment illustrated in FIG. 2 is, by the way, comparable to the operation described with reference to FIG. 1, wherein only the pressure $P_1$ has to be adapted accordingly.

Embodiments of the invention thus provide a device and a method for dispensing a liquid volume, wherein a pump means, for example a syringe pump drive having at least one additional dosing unit (micropump, pinch valve, dosing unit according to WO 2005/016534 A1 or the like) is used for a controlled and monitored delivery of liquid. A closed, compressible gas-filled cavity is located in the interior of the pump means (for example the syringe) and is in fluidic contact with a pressure sensor for a contamination-free detection of the interior syringe pressure. The measured pressure in the enclosed cavity is used as a primary variable for the determination, control and monitoring of the dosed amount of substance according to a physical gas law, for example Boyle-Mariotte's law. The dosing volume may be controlled by clearly associating a corresponding pressure difference $\Delta P$ to the desired dosing volume by means of the gas law. As the control is merely related to the pressure difference, it is not necessary to readjust the initially prevailing pressure $P_0$. Hereby, manufacturing tolerances in the syringe pump and positioning tolerances of the drive may be compensated and also using passive dosing units, for example dosing valves, a supply against an increased pressure at the dispensing position is possible.

Although specific embodiments have been described above with reference to FIGS. 1 and 2 using a syringe pump as a pump means, it is obvious for persons skilled in the art that likewise other pump means may be used, using which an increased pressure may be generated in a gas volume which is directly or indirectly fluidically coupled with a liquid volume to be dispensed.

In other words, embodiments of the invention provide a dosing system for dosing a liquid depending on demand, which comprises a syringe pump including a compressible gas volume with a constant amount of substance which is in direct or indirect fluidic contact with the liquid to be dosed. The dosing system comprises a pressure sensor which is in fluidic contact with the compressible gas volume and measures the pressure in this volume. The dosing system comprises a drive for the syringe pump which may be controlled depending on the pressure determined by the pressure sensor, and a dosing unit which is connected to the outlet of the syringe pump and may supply and/or discharge liquid from the syringe pump.

Knowing the type and size of the enclosed gas volume or the amount of substance of the enclosed gas volume is not required for acquiring a precision. It is merely advantageous for improving the correctness of the dosage that the amount of substance of the enclosed volume is not only constant but is additionally also known.

In embodiments of the invention, the compressible gas volume may be realized by a bore in the piston of the syringe pump drive. In other embodiments, the compressible gas volume is not realized by a bore in the piston of the syringe pump drive, wherein a pressure sensor may then be connected in a different way to that illustrated. In embodiments, the compressible gas volume and the liquid to be dosed may be separated fluidically by an elastic membrane. In embodiments, all components which come into contact with the liquid may be implemented as disposable components for single use. In embodiments, the syringe pump may not be implemented as a disposable component. In embodiments, the liquid to be dosed may be located in a pipette tip. In embodiments, the liquid-contaminated components may be changed automatically, wherein corresponding means may be provided. In embodiments of the invention, the dosing unit may be implemented at the outlet of the syringe pump as a micropump, as a peristaltic pump, as a dosing valve or as a pinch valve. In embodiments, the dosing unit may be implemented as a dosing unit as it is described in WO 2005/016534 A1. In embodiments, the fluidic contact between the pressure sensor and the enclosed gas volume is produced via the piston of the syringe pump. In embodiments, the pressure sensor may be used to detect the mechanical contact between the syringe pump drive and the piston of the syringe pump. In embodiments, the pressure sensor may be implemented as a silicon membrane sensor.

Again in other words, embodiments of the present invention provide a method for operating a sensor-monitored and sensor-controlled dosing system for dosing a liquid depending on the demand, comprising the following steps: receiving or taking the liquid to be dosed into a syringe pump which may comprise a known setup, by aspiration at the dispensing position or filling the syringe body before introducing the piston; generating an overpressure within the syringe pump by operating the piston of the syringe pump with the help of a syringe pump drive until the pressure within the syringe pump takes on a changed pressure value $P_1$; and supplying the liquid and interconnected dosing of the liquid at the dispensing position by operating a dosing unit located at the outlet end of the syringe pump until a decrease of pressure prevailing in the syringe pump by a value $\Delta P$ has resulted which, according to a physical gas law, corresponds to the volume to be dosed.

With passive dosing units, for dispensing liquid an increased pressure value $P_1$ is generated which, according to a physical gas law, corresponds at least to the volume to be dosed. For active dosing units this is not required. Merely the pressure at the end of dosing would then be smaller than $P_0$, which does not, however, present a problem.

In methods according to such embodiments, the time-varying pressure while dispensing the liquid may be plotted. From the plotted time-varying pressure while dispensing the liquid, the flow rate of dosing may be determined From the plotted time-varying pressure while dispensing the liquid, the complete dispensed volume may be calculated. From the plotted time-varying pressure while dispensing the liquid, interferences of the dosing process may be determined, such as, for example, a clogged dispensing position. From the plotted time-varying pressure while dispensing the liquid, further information or other variables relevant for dosing quality, such as, e.g., dosing duration, may be gained which may be considered for the further increase of precision in subsequent dosing operations.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for dispensing or receiving a liquid volume, comprising:
   a liquid reservoir comprising an outlet;
   a pressure generator which is implemented to provide a compressible gas volume enclosed in the liquid reservoir with a pressure, wherein the compressible gas volume has a constant amount of substance and the gas volume is in direct or indirect fluidic contact with the liquid in the liquid reservoir;
   a doser coupled to the outlet of the liquid reservoir and configured to be operated in order to enable the liquid to pass the outlet;
   a pressure sensor for measuring a pressure existing in the gas volume and for outputting an output signal indicating the current pressure in the gas volume; and
   a controller coupled to the pressure generator, the doser and the pressure sensor and which is implemented to:
   control the pressure generator in order to change the pressure in the gas volume until the output signal of the pressure sensor indicates a first pressure, while the doser is not operated so that it prevents liquid from passing the outlet,
   operate the doser depending on the output signal of the pressure sensor in order to dispense or receive liquid through the outlet, and
   while dispensing or receiving liquid through the outlet, monitor the output signal of the pressure sensor and, depending on the monitored output signal of the pressure sensor, at least temporarily terminate the operation of the doser, wherein
   the pressure generator includes a syringe pump with a syringe body and a piston, and
   the piston is movable by a drive to change the pressure in the gas volume relative to the syringe body.

2. The device according to claim 1, wherein the controller is implemented to terminate the operation of the doser when the monitored output signal of the pressure sensor indicates that the pressure within the gas volume has changed by a predetermined pressure difference.

3. The device according to claim 1, wherein the controller is implemented to terminate the operation of the doser when the monitored output signal of the pressure sensor over time fulfills a predetermined condition.

4. The device according to claim 1, wherein the controller is implemented, based on the output signals of the pressure sensor over time, to calculate a flow rate of a flow of the liquid through the outlet and/or an overall dispensed or received liquid volume and to terminate the operation of the doser when the flow rate and/or the overall dispensed or received liquid volume indicates the dispensing or receiving of a certain liquid volume.

5. The device according to claim 1, wherein the controller is implemented, based on the output signals of the pressure sensor, to detect the presence of an interference.

6. The device according to claim 1, wherein the piston of the syringe pump comprises a bore, wherein at least parts of the compressible gas volume are arranged within the bore.

7. The device according to claim 6, wherein the pressure sensor is in fluidic contact with the enclosed gas volume via the bore.

8. The device according to claim 1, wherein the liquid reservoir is at least partially defined by the syringe body.

9. The device according to claim 1, wherein the liquid reservoir is implemented as a member which is detachable from the pressure generator.

10. A device for dispensing or receiving a liquid volume, comprising:
    a liquid reservoir comprising an outlet;
    a pressure generator which is implemented to provide a compressible gas volume enclosed in the liquid reservoir with a pressure, wherein the compressible as volume has a constant amount of substance and the gas volume is in direct or indirect fluidic contact with the liquid in the liquid reservoir;
    a doser coupled to the outlet of the liquid reservoir and configured to be operated in order to enable the liquid to pass the outlet;
    a pressure sensor for measuring a pressure existing in the gas volume and for outputting an output signal indicating the current pressure in the gas volume; and
    a controller coupled to the pressure generator, the doser and the pressure sensor and which is implemented to:
    control the pressure generator in order to change the pressure in the gas volume until the output signal of the pressure sensor indicates a first pressure, while the doser is not operated so that it prevents liquid from passing the outlet,
    operate the doser depending on the output signal of the pressure sensor in order to dispense or receive liquid through the outlet, and
    while dispensing or receiving liquid through the outlet, monitor the output signal of the pressure sensor and, depending on the monitored output signal of the pressure sensor, at least temporarily terminate the operation of the doser, wherein
    the liquid reservoir is implemented as a member which is detachable from the pressure generator, and
    the liquid reservoir is implemented as a pipette tip mountable to the pressure generator.

11. The device according to claim 1, comprising a flexible membrane fluidically separating the liquid to be dispensed from the compressible gas volume.

12. The device according to claim 1, wherein the doser is implemented as a micropump, a peristaltic pump, a dosing valve or a pinch valve.

13. The device according to claim 1, wherein the doser comprises a flexible tube and a displacer by which the volume of a section of the flexible tube is changeable in order to dispense liquid to be dispensed as free-flowing droplets or as a free-flowing jet.

14. A device for dispensing or receiving a liquid volume, comprising:
- a liquid reservoir comprising an outlet;
- a pressure generator which is implemented to provide a compressible gas volume enclosed in the liquid reservoir with a pressure, wherein the compressible gas volume has a constant amount of substance and the gas volume is in direct or indirect fluidic contact with the liquid in the liquid reservoir;
- a doser coupled to the outlet of the liquid reservoir and configured to be operated in order to enable the liquid to pass the outlet;
- a pressure sensor for measuring a pressure existing in the gas volume and for outputting an output signal indicating the current pressure in the gas volume; and
- a controller coupled to the pressure generator, the doser and the pressure sensor and which is implemented to:
- control the pressure generator in order to change the pressure in the gas volume until the output signal of the pressure sensor indicates a first pressure, while the doser is not operated so that it prevents liquid from passing the outlet,
- operate the doser depending on the output signal of the pressure sensor in order to dispense or receive liquid through the outlet, and
- while dispensing or receiving liquid through the outlet, monitor the output signal of the pressure sensor and, depending on the monitored output signal of the pressure sensor, at least temporarily terminate the operation of the doser, wherein
- the controller is implemented, after the at least temporary termination of the operation of the doser, to operate the doser at least once again and to terminate this renewed operation depending on the output signal of the pressure sensor so that several partial volumes of the liquid are dispensed or received from the outlet iteratively.

15. The device according to claim 14, wherein the controller is implemented, with an iterative discharge of a further partial volume, with respect to the operation of the doser, to consider data which were gained when dispensing or receiving a previous partial volume.

* * * * *

UNITED STATES PATENT AND TRADEMARK OFFICE
CERTIFICATE OF CORRECTION

PATENT NO.         : 9,459,128 B2
APPLICATION NO.    : 13/907365
DATED              : October 4, 2016
INVENTOR(S)        : Koltay et al.

It is certified that error appears in the above-identified patent and that said Letters Patent is hereby corrected as shown below:

Claim 10, Column 16, Line 28 should be corrected as follows:
    "the compressible as" should read --the compressible gas--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*